Dec. 2, 1969   C. C. YANN   3,481,232
METHOD AND APPARATUS FOR MAKING NONPILFERABLE CONTAINER CLOSURES
Filed Oct. 23, 1967   4 Sheets-Sheet 1
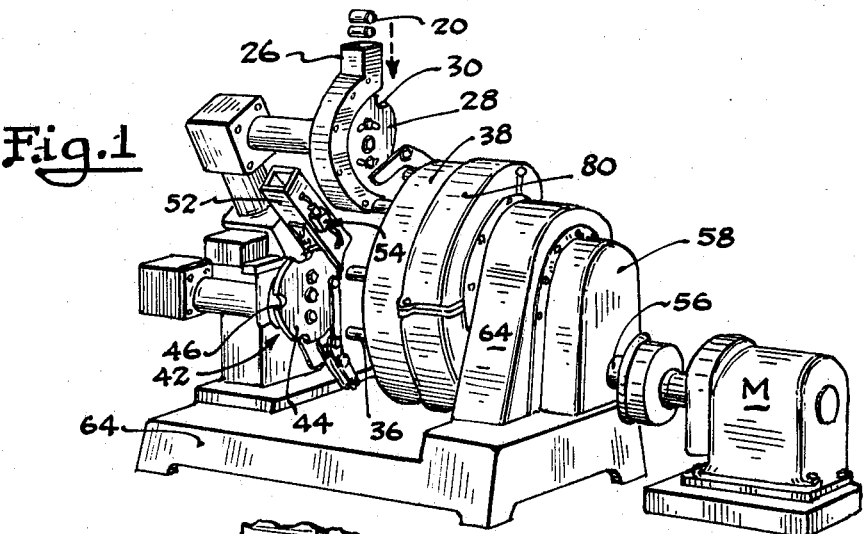
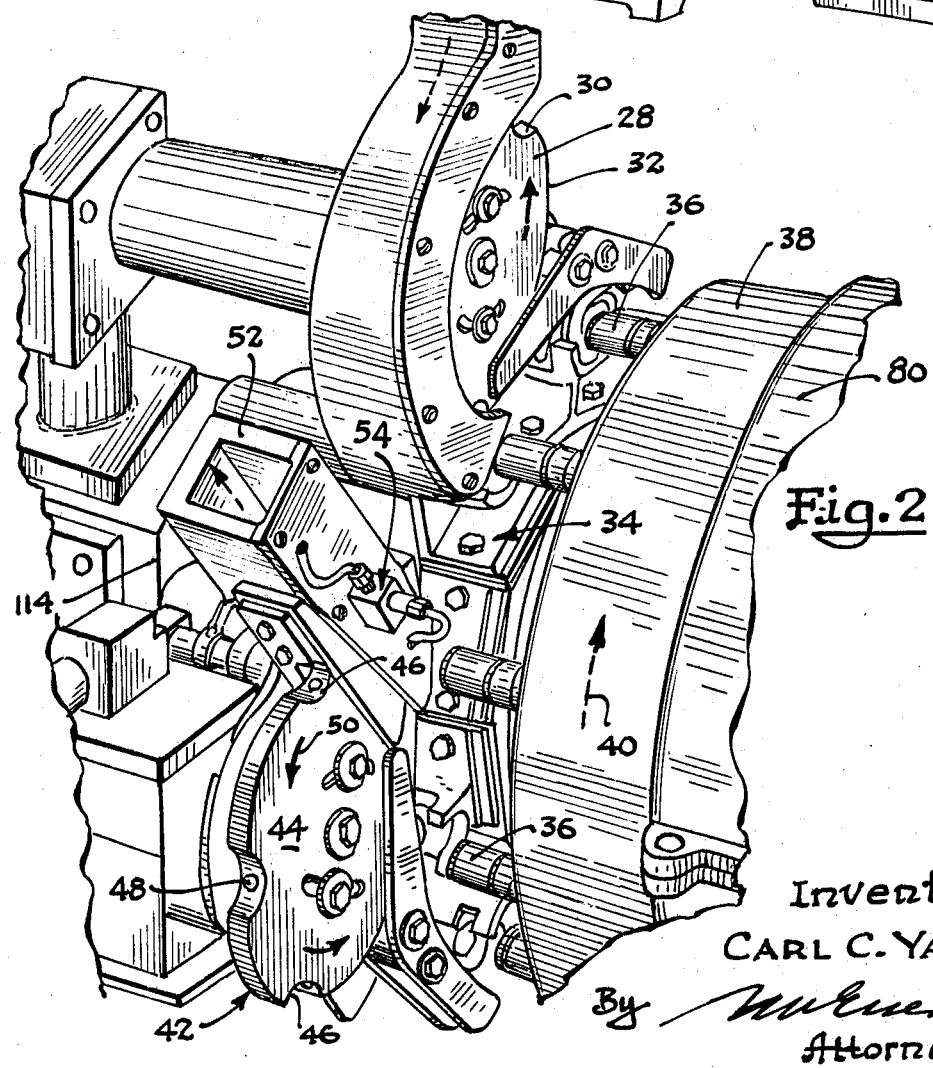
Inventor
CARL C. YANN
By   *Werner*
Attorney Dec. 2, 1969   C. C. YANN   3,481,232
METHOD AND APPARATUS FOR MAKING NONPILFERABLE CONTAINER CLOSURES
Filed Oct. 23, 1967   4 Sheets-Sheet 2
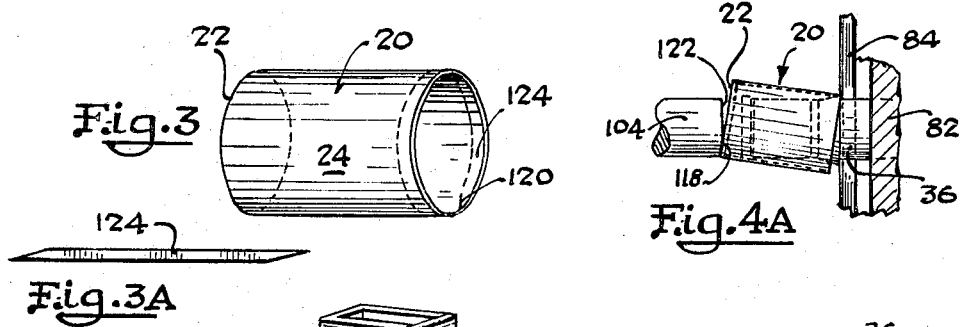
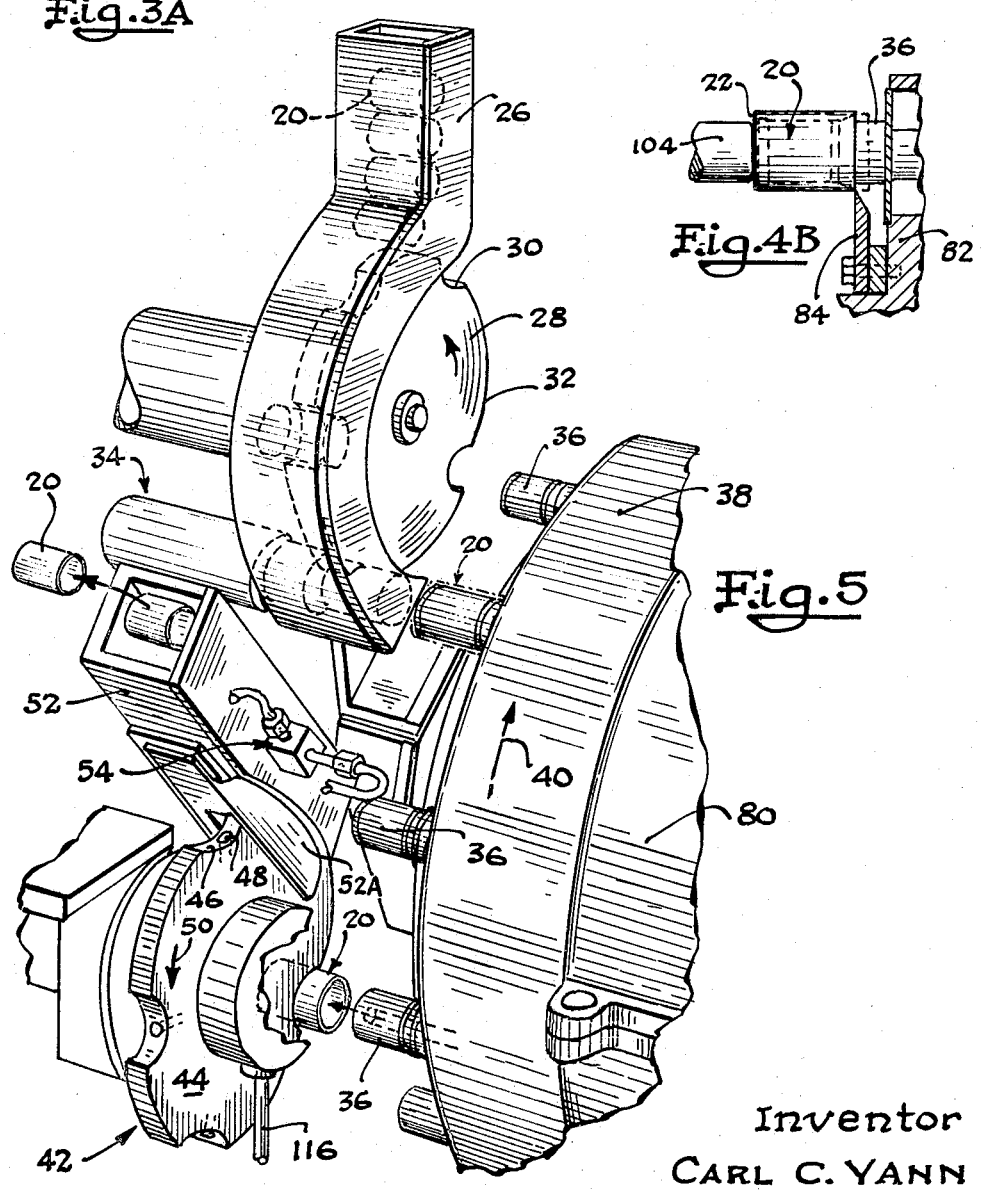
Inventor
CARL C. YANN
By (signature)
Attorney

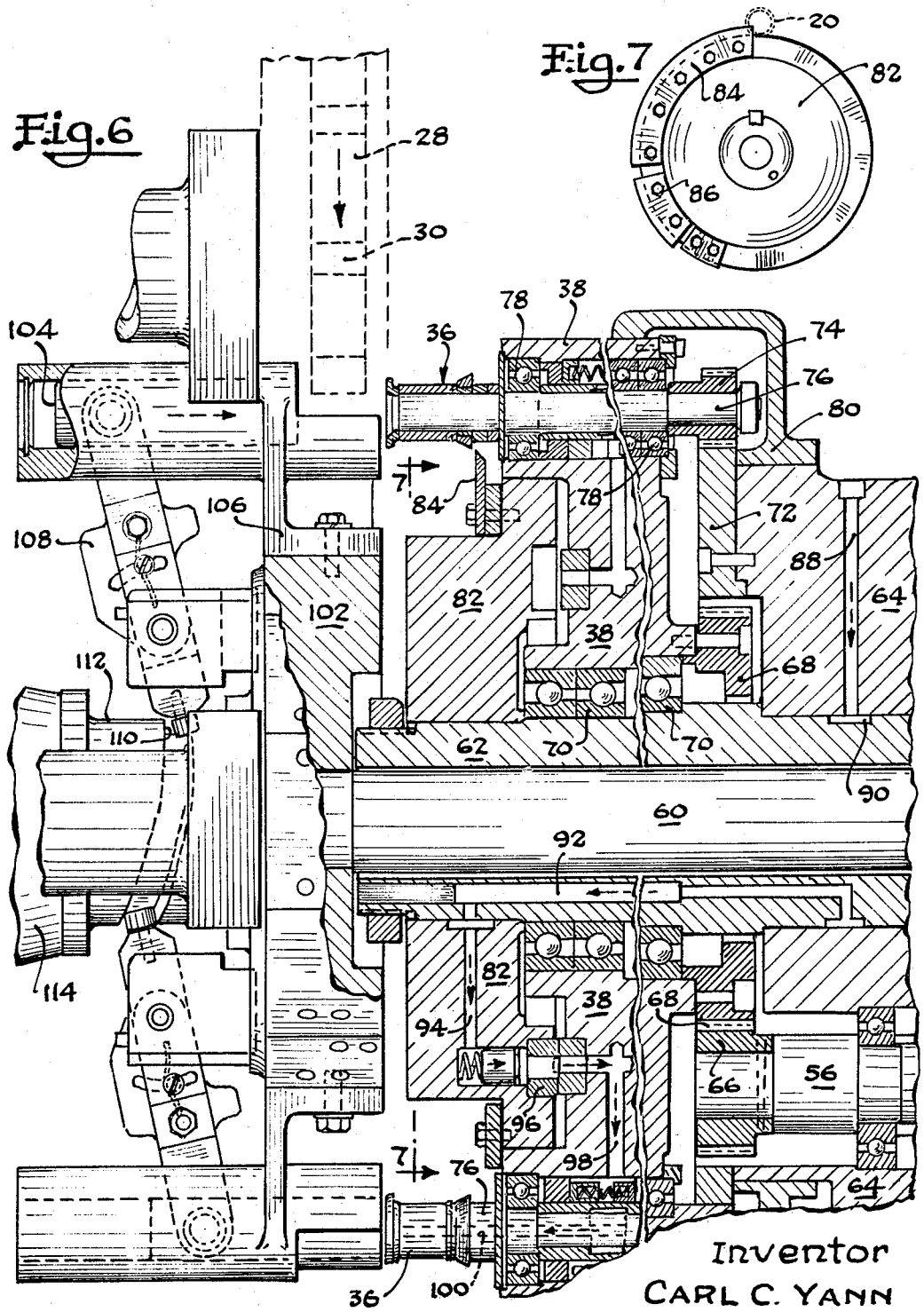

Dec. 2, 1969  C. C. YANN  3,481,232
METHOD AND APPARATUS FOR MAKING NONPILFERABLE CONTAINER CLOSURES
Filed Oct. 23, 1967  4 Sheets-Sheet 4

Inventor
CARL C. YANN
By [signature]
Attorney

United States Patent Office 3,481,232
Patented Dec. 2, 1969

3,481,232
METHOD AND APPARATUS FOR MAKING NON-PILFERABLE CONTAINER CLOSURES
Carl C. Yann, Valley Station, Ky., assignor to Chemetron Corporation, Chicago, Ill., a corporation of Delaware
Filed Oct. 23, 1967, Ser. No. 677,376
Int. Cl. B23b 5/14, 7/00, 3/04
U.S. Cl. 82—46                              12 Claims

ABSTRACT OF THE DISCLOSURE

Apparatus and method for trimming and embossing container closure blanks where an infeed mechanism including plungers having beveled faces tilts the blanks onto successively presented spindles and angularly feeds the blanks into a cutting member for shearing a portion of the material from the open end of each blank and a removal mechanism having negative pressure pockets unloads the trimmed closures and ejects them from the apparatus.

---

This invention relates to method and apparatus for making nonpilferable closures or caps for containers from cup-shaped blanks.

A nonpilferable closure comprises a cup-like member having a generally flat top portion from which a cylindrical skirt depends. The skirt has a main section adjacent the top and a relatively narrow section at the open end. The main section usually is embossed with the product name or a trademark. After the closure is positioned on an associated container, the narrow section of the skirt is crimped or beaded about the container to secure the closure against axial movement from the container. The skirt is scored between the main and narrow section to provide elongated slits which are separated by short lengths of uncut material that effectively hold the main and narrow sections together. Threads are formed in the cap by a transfer from corresponding threads of the container through the use of rollers pressing against the closure. In other words, the container is the die for forming the thread in the closure when the container is capped after filling. By twisting the main portion of the closure, the closure moves axially from the container and the short lengths of uncut material are ruptured because axial movement of the narrow section is prevented by being crimped. The closures or caps are usually formed of thin aluminum metal which is coated with a brightly colored paint.

It will be recognized by those skilled in the art, that as the closures are roughly blanked from a supply of pliable sheet material, the skirt portions are drawn to unequal lengths by the forming dies. It is customary to trim off the uneven marginal portions of the skirt smoothly along its free edge with a trimming device. This reduces the closures to a uniform length. By cutting the closures to a predetermined length the narrow section of the skirt extends to a predetermined position where it is rolled under a bead provided on the container as hereinbefore described. The uniform lengths also prevent choking and jamming of conveyor systems and other forming apparatus positioned beyond the trimming device. Therefore, considerable expensive damage and delay is eliminated. If the waste portion which is trimmed from each closure is not efficiently rejected from the trimming and embossing apparatus, the rate of production and economic performance of the apparatus is substantially reduced. If the waste portion is cut off in the shape of a continuous annulus, it tends to remain on the spindle after the trimmed closure is removed from the spindle. Expensive additional equipment or a shut down of the apparatus with additional manual effort are required to remove these annuli.

This invention provides improved apparatus for the expeditious finishing of closure caps and especially for accomplishing the trimming and embossing operations. Preformed thimble-like closure shells are fed through a chute into a rotating star wheel which sequentially advances the shells toward a carrier. As the carrier rotates, a plunger is actuated to push a shell onto a spindle which carries the shell while the trimming and embossing operation is performed. The plunger is cut on a slight angle across a portion of its face for tilting the shell during its insertion on the spindle so that it will feed into a stationary cutter for removing a generally trapezoidal strip of waste material from the open end of the shell. The trimmed shells are discharged into a second star wheel having vacuum pockets. The negative pressure at these pockets holds the shells on the second star wheel until the shells are discharged into a chute where they are propelled from the apparatus by air.

It is an object of this invention to provide improved apparatus for the formation of uniformly accurate container caps.

Another object of this invention is to provide a closure forming system which expeditiously handles a continuous supply of closure blanks and performs a sequence of separate, but correlated steps on the blanks.

An additional object of this invention is to provide apparatus for trimming and embossing closure blanks to a uniform high quality in a substantially continuous and automatic fashion.

Still another object of this invention is to provide apparatus which is economically feasible for installation in a system in which relatively thin material is continuously formed into a nonpilferable closure which is suitable for final securement on the container to be closed.

A feature of this invention is to provide novel means for angularly presenting a closure blank to a stationary cutter die.

Another feature of this invention is to provide means for removing the trimmed and embossed closure blanks from rotating spindles.

Further objects as well as features and advantages of this invention will become apparent as the following description of an illustrated embodiment thereof proceeds and is given for the purpose of disclosure and is taken in conjunction with the accompanying drawings in which like character references designate like parts throughout the several views and where:

FIG. 1 is a perspective view of apparatus incorporating the principles of this invention;

FIG. 2 is a perspective view of a fragmentary portion of the apparatus in FIG. 1, showing the closure infeed and removal mechanisms;

FIG. 3 is a perspective view showing a cap blank before trimming;

FIG. 3A is a plan view of a strip of material trimmed from the open end of the cap blank;

FIG. 4A is a plan view of the cap blank engaging the trimming die;

FIG. 4B is a sectional view showing the cap blank with the strip of material being fully trimmed off;

FIG. 5 is a view similar to FIG. 2 with portions being broken away to illustrate this invention;

FIG. 6 is an elevational view, partly in section, of the feed mechanism;

FIG. 7 is a vertical view taken along the line 7—7 of FIG. 6 looking in the direction indicated by the arrows;

Figure 8:
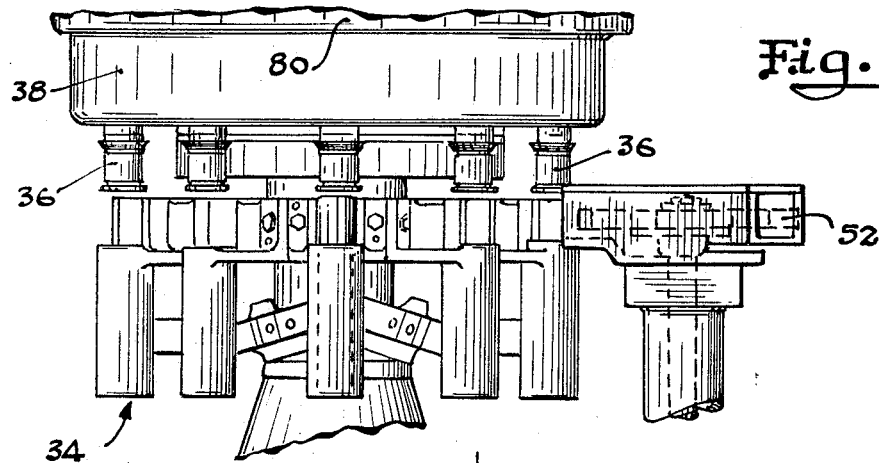
FIG. 8 is a plan view of the infeed and removal mechanisms.
Figure 9:
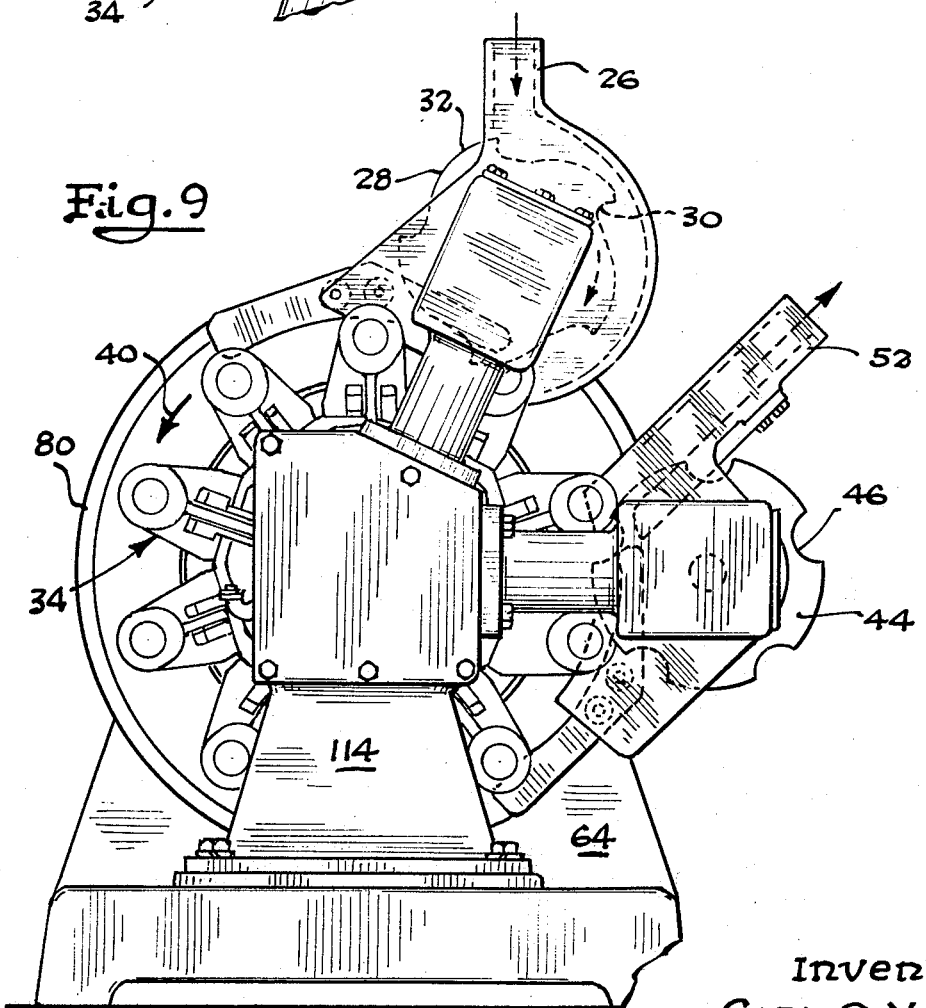
FIG. 9 is an end elevational view of the apparatus shown in FIG. 1.

Referring now to the several figures and first to FIG. 1, cap blanks or shells 20 which have been preformed by punch and draw means (not shown) are conveyed to a trimming and embossing apparatus embodying this invention in an oriented relation so that their open ends are facing in the same direction, namely toward the apparatus. The blanks 20 for making closure caps are drawn from thin sheet material such as aluminum to an elongated cup-like form as shown in FIG. 3. Each of the shells 20 has a relatively flat top portion 22 and an extending cylindrical skirt portion 24.

The shells 20 (FIG. 1) are fed in a continuous line, with the skirt of one shell resting on the skirt of another, through a chute 26 toward a rotating feed star 28. At the bottom of the chute 26, the lowermost one of the shells falls into a pocket 30 which is formed in the rim of the star 28. As the star turns, the next shell is supported by a land portion 32 of the rim until the next successive pocket 30 is rotated to a position below such next shell, and so forth.

The shells are delivered to a loading station where they are successively picked up by an infeed mechanism generally indicated at 34 wherein the shells are loaded onto successively presented spindles 36. A series of the spindles 36 are mounted on a head 38 which moves the spindles in a fixed circular path. The head 38 is rotatably driven in the direction shown with an arrow 40 by a motor, such as a variable speed electric motor M through suitably interconnected gear means hereinafter described. As the shells are rotated on the spindles, they are trimmed and embossed, as will presently be described.

After the open end of the shell is evenly trimmed and the surface of the skirt is embossed, the shells are successively unloaded to removal mechanism indicated generally at 42 as rotating in the direction of arrow 50 and which includes a star hub or wheel 44. The shells are received in pockets 46 which are formed in the rim of the wheel 44. Vacuum means provide a negative pressure at an orifice 48 (FIG. 2) in each of the pockets 46 and hold the shell in the pocket 46. As the wheel 44 rotates, the shells are successively ejected into a discharge chute 52. Means 54 for supplying air under pressure assists in moving the shells along the chute 52 away from the apparatus to other machinery (not shown) for further processing and forming.

The apparatus is driven by the variable speed electric motor M (FIG. 1) which is operatively connected for rotating a drive shaft 56 journalled through a gear housing cover 58. The drive shaft 56 which is rotatably mounted in a housing member 64 carries a drive pinion (not shown) that meshes with gear teeth on a drive gear (not shown) on a main shaft 60 (FIG. 6). The shaft 60 is journalled for rotation in a centering shaft 62 which is fixed in the housing member 64 that supports this apparatus.

A head drive pinion 66 is carried near the end of the drive shaft 56 for driving a head drive gear 68 which is fixed with cap screws to the head 38. As the shaft 56 is driven, the pinion 66 and gear 68 cooperate to rotate the head 38 that is journalled about the centering shaft 62 on bearings 70. Thus as the head 38 rotates, the spindles 36 are moved in a fixed circular path about the axis of the centering shaft 62. A sun gear 72, that is held stationary to housing 64 with socket head screws, transmits rotary motion to the planatary gear 74 fixed about a spindle shaft 76. The shaft 76 is journalled for rotation in a suitable opening in the head on bearings 78. In this way, as each spindle is moved around the circular path it is individually rotated about its own axis. A gear housing 80 is mounted to the housing member 64 to cover the gear arrangement just described. The housing 80 overlaps a portion of the head 38 as the head rotates. A face plate 82 is attached to the centering shaft 62 to cover the outer face of the head and to provide a mount for an arcuate trim cutter 84 and an arcuate embossing segment 86 (FIG. 7).

An air channel 88 in the housing member 64 is connected with a source of air under pressure (not shown). The channel 88 connects with an air path 90 formed about the centering shaft 62. From the path 90, the air enters a longitudinal channel 92 in the lower portion of the shaft 62 and thereafter enters a channel 94 in the bottom portion of the face plate 82. Valve means 96 in the plate 82 and head 38 regulate the flow of air from the channel 94 into a head tube 98. The body of each spindle is ported so that as the spindle reaches a predetermined position along its path whereat the trimmed and embossed cap blank is to be removed by the removal mechanism 42, the air under pressure enters a vent tube 100 in the spindle shaft 76. The air leaving the vent tube 100 impinges against the inside surface of the top of the blank and assists the blank in moving axially from the spindle.

A hub member 102 is keyed to the main shaft 60 so as to be rotated by the shaft. The infeed mechanisms 34 are fastened to the hub 102 so that there is a feed mechanism associated with each of the spindles 36. At each feeding station on the hub member, a plunger 104 is mounted for axial movement in an opening through a plunger housing 106 which is attached to the hub 102. Each plunger 104 is axially aligned with a corresponding one of the spindles 36. The plungers 104 are moved axially through a link assembly 108 which is guided at one end by a stationary cam track 110 formed in the outer surface of the cam member 112. The link assembly 108 is operatively connected to release itself if the apparatus should become clogged with blanks and thus to prevent extensive damage. The cam track 110 is configured to move each plunger toward its associated spindle for feeding a blank from the feed star 28 onto the spindle and into the trim cutter 84. The plunger then holds the blank on the spindle as the trimming and embossing operations are completed. Finally the cam moves the plunger away from the spindle along the segment of the path where air leaving the vent tube 100 blows the blank from the spindle. The air pressure is sufficiently strong so that the caps lie against the face of the plunger as it is being withdrawn until the blank is picked up by the removal mechanism 42. The plunger is then held away from the spindle until the plunger is rotated to a position along its path for receiving another blank from the infeed mechanism for insertion onto the spindle. FIG. 6 illustrates that the feed star 28 is positioned to move the blank into the path of the plunger as it moves toward the spindle.

Gears (not shown) in a supported housing 114 operatively connect to the main shaft 60 for rotating both the feed star 28 and the star wheel 44. Thus, it can be seen that all the interconnected moving parts of this apparatus are effectively and positively driven by the one motor M.

The pockets 46 of the star wheel 44 move into a position for intersecting the trimmed and embossed cap blank as it is moving away from the spindle. The wheel 44 is moving in the direction of the arrow 50 and centrifugal force tends to pull the blank out of the pocket. A negative pressure source is connected through a tube 115 (FIG. 5) and suitable chambers in the wheel 44 to the orifices 48. The vacuum at the orifices holds the blanks in the pockets until the blanks reach the discharge chute 52. The positive pressure air being exhausted out through the chute 52 and the camming action of cam or plate 52A lifts the blanks from the pockets and blows the blanks out of the chute 52.

The face of each plunger 104 is beveled as at 118 (FIG. 4A) to permit tilting of the shell 20 as it contacts the trimming cutter 84. Thus the shell is at an angle after it first contacts the cutter 84 and an initial angular cut 120 is made into the skirt portion 24. As the plunger inserts the blank still further onto the spindle, the blank 20 is moved to a relatively concentric position about the spindle and a flat surface 122 of the plunger face holds the blank in an axially aligned position on the spindle as the spindle moves along the circular path. Gear means, hereinbefore described rotate the spindle and the blank which is mounted thereabout, as a substantially trapezoidal waste strip 124 is cut from the open end of the blank while the blank is moved in rolling contact along the trimming cutter 84. Since the waste piece 124 is a strip and not an annulus, it easily falls away from the spindle and does not clog the apparatus. If the blank were moved axially onto the spindle, an annular waste strip would be cut off which would have to be removed from the spindle by a complicated mechanical arrangement or by hand. This invention cuts the waste portion from the blank in such a shape that it is easily thrown clear.

Thus, it will be appreciated that all of the recited objects, advantages and features of this invention have been demonstrated as obtainable in a highly practical apparatus and one that is simple and positive in operation. It will be further understood that although this invention has been described with respect to certain specific embodiments thereof, this invention is not limited thereto, since various modifications of said invention will suggest themselves from the aforesaid description and are intended to be encompassed within the scope of the appended claims wherein there is claimed:

1. Apparatus for trimming material from thimble-like container closure shells having a skirt portion, the extremity of which is irregular, comprising: a trimming die; at least one rotating spindle dimensioned for receiving the skirt of the closure shell about the spindle; means associated with each spindle for feeding the closure shell onto the spindle; means for angularly positioning the closure shell on initial engagement of the skirt with the die to cut into the material of the skirt at an angle; means for moving the spindle into operative relation with the die so the die cuts through the material of the skirt; and means associated with the angular positioning means for repositioning and holding the closure shell in axial parallelism with the spindle to trim the shells to a uniform length and remove a waste strip from the skirt extremity.

2. Apparatus as claimed in claim 1 wherein said trimming die is a stationary arcuate member and said means for moving the spindles comprises a head on which the spindles are mounted to move in a first circular path.

3. Apparatus as claimed in claim 2 wherein said feeding means move in a second circular path adjacent the first circular path.

4. Apparatus as claimed in claim 3 further comprising means for successively transferring individual untrimmed shells into a position for engagement by the feeding means; and means for successively receiving trimmed shells from the rotating spindles.

5. Apparatus for trimming the outer end from a cylindrical skirt of a container closure shell, comprising: a rotatably mounted spindle having a diameter small enough to provide clearance space between the outside of the spindle and the inside of the skirt; a stationary trim die; means for moving the rotatably mounted spindle and urging a continuously changing portion of the skirt into cutting engagement with the die; infeed means for initially feeding the shell along a feed path onto the spindle and into angular engagement with the die and subsequently repositioning the shell into axial parallelism with the spindle for trimming the shell to an even length.

6. Apparatus as claimed in claim 5, further comprising means for driving said spindle, said spindle moving means, and said infeed means.

7. Apparatus as claimed in claim 6 further comprising means for sequentially moving the closure shells into the feed path of said infeed means and said spindle having means for removing the trimmed shell from the spindle along an ejection path.

8. Apparatus as claimed in claim 7 further comprising rotating removal mechanism intersecting the ejection path for transporting the trimmed shell from the apparatus.

9. Apparatus as claimed in claim 8 wherein the driving means further drives the infeed means and the rotating removal mechanism.

10. Apparatus for evenly trimming the outer end of skirt portion of metallic closure shells comprising: a plurality of rotatably mounted spindles, each spindle being adapted to receive a shell, the spindle diameter being small enough to provide clearance space between the spindle surface and the inner surface of the skirt; means for rotating the spindles and simultaneously moving them in a circular path; an arcuate stationary trimming die; the circular path being positioned for urging a continuously changing portion of the skirt into cutting engagement with the die; means for feeding individual shells onto sequentially presented spindles at a feed position in said circular path, said feed position being located along the circular path before the skirt engages the trimming die; means for individually removing trimmed shells from sequentially presented spindles at a removal position being located along the path after the skirt is evenly trimmed by the die.

11. Apparatus as claimed in claim 10 further comprising means for driving said rotating means, said feeding means and said removal means.

12. Apparatus as claimed in claim 11 wherein said feeding means comprises a plurality of plungers moving in circular path, one plunger being associated with each of said spindles, said plungers being axially movable along a linear path which is parallel to the axis of the associated spindle, each plunger having a flat face portion which is perpendicular to its linear path and an angular face portion which is angled to the linear path; said angular face portion initially engaging the top of the shell and angularly feeding the shell into cutting engagement with the die for making an angular cut into the shell and said flat face portion repositioning the shell into perpendicular relationship with the die for trimming the skirt to an even length.

References Cited

UNITED STATES PATENTS

| | | | |
|---|---|---|---|
| 2,114,272 | 4/1938 | Temple | 82—85 |
| 2,298,366 | 10/1942 | Gladfelter et al. | 82—85 |
| 3,302,500 | 2/1967 | Hackenberger et al. | 82—97 |
| 3,420,127 | 1/1969 | Kiss et al. | 82—83 |

HARRISON L. HINSON, Primary Examiner

U.S. Cl. X.R.

82—48, 85, 101